UNITED STATES PATENT OFFICE.

LOUIS H. G. EHRHARDT, (CHARLES H. BRUTTON, ADMINISTRATOR,) OF PHILADELPHIA, PENNSYLVANIA.

PROCESS OF MAKING ARTIFICIAL PARCHMENT OR TOUGHENING PAPER.

SPECIFICATION forming part of Letters Patent No. 228,328, dated June 1, 1880.

Application filed September 20, 1879.

*To all whom it may concern:*

Be it known that I, LOUIS H. G. EHRHARDT, of the city and county of Philadelphia, and State of Pennsylvania, have invented a new and useful Improvement in Processes of Making Artificial Parchment or Toughening Paper, which improvement is fully set forth in the following specification.

During the stage of the manufacture of paper when the pulp is ready for the size, I add thereto a quantity of silicate of soda and chloride of zinc, or their equivalents, adding, also, a little more alum, sufficient to allow the chemical action between the silicate of soda and alum. When the paper is tub-sized I add the ingredients named to the size in the tub.

The quantity of the above-named ingredients may vary according to the stock used and the amount of toughness required. For example, to make a good strong paper, I use, to five hundred pounds pulp, two gallons silicate of soda, about four to five pounds of alum, and eight to ten pounds chloride of zinc.

Omitting the silicate of soda and alum, and using only the chloride of zinc, a very good paper may be produced; but I prefer to employ all of the ingredients named, for I thereby obtain a closer and better filled paper.

Excepting the addition of the above-named ingredients and the manner of applying the same, the ordinary process of making paper is adhered to without change of apparatus, manipulation, &c., the toughening process or treatment of the paper subsequent to the finishing thereof being entirely dispensed with.

Having thus described my invention, what I claim as new, and desire to secure by Letters Patent, is—

1. The process of manufacturing tough or so-called "parchment" paper, consisting in adding the above-named ingredients to the pulp, substantially as and for the purpose set forth.

2. The combination of the ingredients herein named with pulp, substantially as and for the purpose set forth.

LOUIS H. G. EHRHARDT.

Witnesses:
JOHN A. WIEDERSHEIM,
A. P. GRANT.